United States Patent [19]

Trabue

[11] 4,274,269
[45] Jun. 23, 1981

[54] MANUALLY CONNECTABLE FLEXIBLE COUPLING

[75] Inventor: Gordon C. Trabue, Louisville, Ky.

[73] Assignee: Chemetron Process Equipment, Inc., Louisville, Ky.

[21] Appl. No.: 35,359

[22] Filed: May 2, 1979

[51] Int. Cl.³ .............................................. F16D 3/52
[52] U.S. Cl. ............................. 64/11 R; 64/27 NM; 403/301; 403/306
[58] Field of Search ............ 64/11 R, 6, 27 NM, 23.5, 64/23.6, 1 C, 17 R; 403/301, 302, 306, 305, 300

[56] References Cited

U.S. PATENT DOCUMENTS

| 2,554,311 | 5/1951 | Place ...................................... 64/23.6 |
| 2,667,768 | 2/1954 | Winkler et al. ....................... 64/11 R |
| 3,020,036 | 2/1962 | Kleinschmidt ....................... 64/11 R |
| 3,267,696 | 8/1966 | Sieja ..................................... 64/11 R |
| 3,320,771 | 5/1967 | Roethlisberger et al. ....... 64/27 NM |
| 3,423,957 | 1/1969 | Palmer ................................. 64/11 R |
| 3,895,501 | 7/1975 | Holmes ..................................... 64/8 |

FOREIGN PATENT DOCUMENTS

1297248 · 5/1962 France ..................................... 64/11 R
800972 9/1958 United Kingdom .................... 64/11 R Primary Examiner—Tony M. Argenbright
Assistant Examiner—Magdalen Moy
Attorney, Agent, or Firm—Vincent G. Gioia; John K. Williamson

[57] ABSTRACT

A flexible mechanical coupling for torque transmission is capable of being connected and disconnected by only manual manipulation. The collar of the coupling has diametrically opposed cutouts in its sidewall for loosely receiving complementally shaped resilient locking members which in turn are held in place by a sleeve telescopically disposed over the collar. Flats formed in the shaft beneath each cutout are engaged by the respective members for locking the shaft and the collar against relative rotation. A removable roll pin passing through the shaft and the resilient members restricts axial movement between the collar and shaft. The sleeve is releasably restrained in position over the locking members by a pair of manually removable elastic bands on the collar. One embodiment of the invention provides the manual connection feature for both shafts in the coupling, while in the preferred embodiment only one shaft in the coupling has this feature.

10 Claims, 3 Drawing Figures

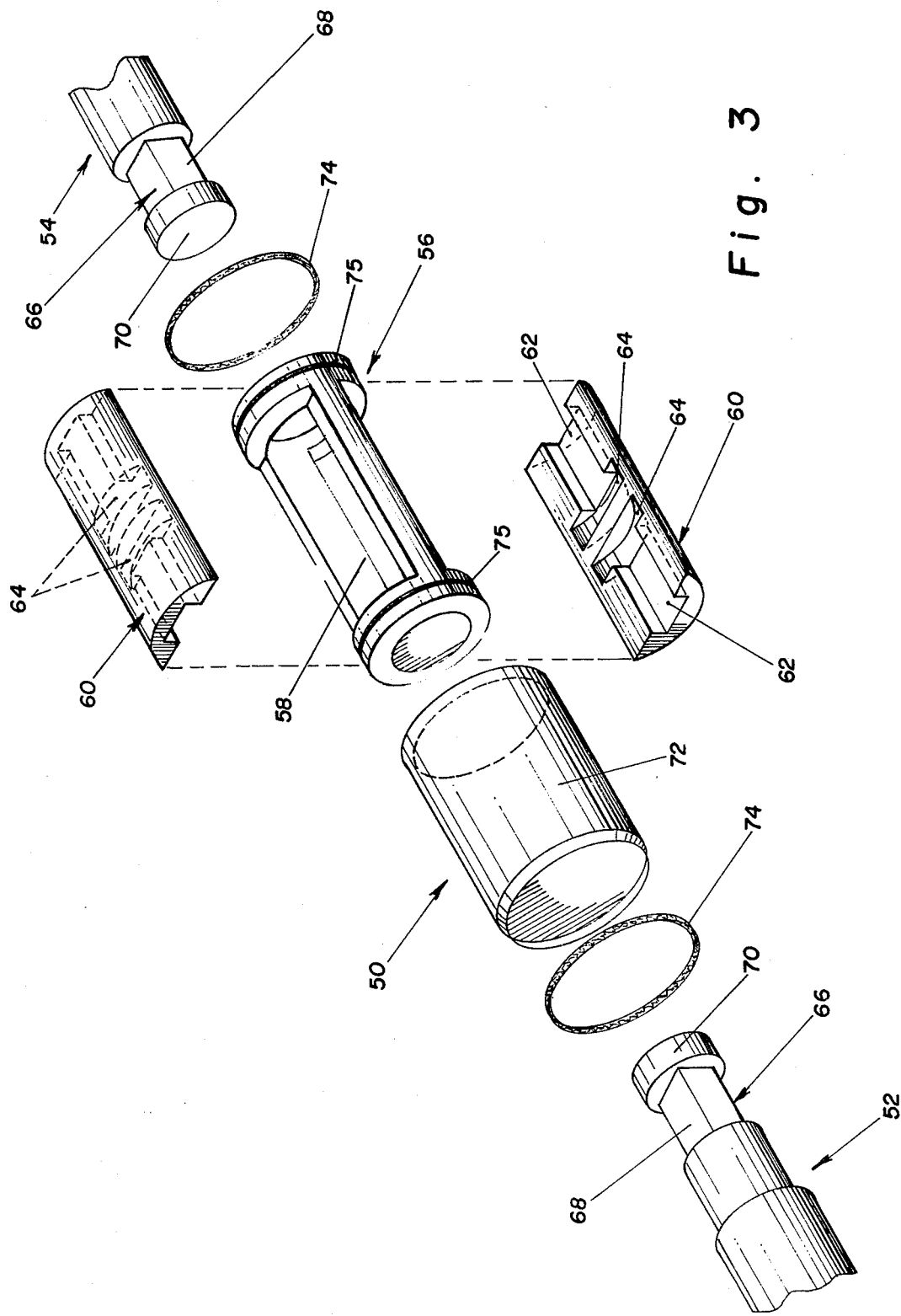

111
MANUALLY CONNECTABLE FLEXIBLE COUPLING

TECHNICAL FIELD

This invention relates to torque transmission couplings in general and is particularly concerned with a flexible mechanical coupling capable of being assembled and disassembled without the use of any auxiliary tools.

BACKGOUND ART

Flexible mechanical couplings are well known in the art and are widely used in low speed, low torque applications. Such couplings are capable of compensating for minor radial, axial, or angular misalignment between the joined shafts thereby reducing the degree of precision which must be exercised in mounting the shafts for rotation.

One example of an advantageous use of a flexible coupling may be found in the drive connection for the scraped surface heat exchanger described in U.S. patent application Ser. No. 876,596, filed Feb. 10, 1978 now U.S. Pat. No. 4,185,352, and owned by the same assignee hereof. There, the central mutator is intermittently supported within in its surrounding heat exchange jacket such that the axis of rotation of the mutator does not remain precisely concentric with the axis of the jacket. To protect the relatively expensive gear drive typically provided for powering the mutator in this machine, a flexible coupling is utilized to insulate the drive shaft against the erratic load fluctuations transmitted by the intermittently supported mutator during rotation thereof.

A disadvantage of all flexible couplings known heretofore is that either they may not be readily disassembled or they require tools for disassembly. This limitation is particularly undesirable in applications where the coupling must be disconnected from time to time for maintenance or cleaning operations.

Considering again the example of the scraped surface heat exchanger described in the above-referenced patent application, it is often required in the normal operation of the heat exchanger to remove the mutator from its surrounding heat exchange jacket for cleaning purposes. However, in many industries the machine operator is not permitted to remove the mutator for cleaning since one or more tools are required to disconnect the coupling. In these industries, various work rules require that a higher paid skilled mechanic perform all operations on plant machinery where tools are required, even if the work involves the use of only a screwdriver or a wrench. Accordingly, it is not unusual for an operator, his machine, and crew to stand by idle for several hours while awaiting a mechanic to become available for removal of a bolt or a screw so that cleaning operations can commence. Understandably, this is highly undesirable from the standpoint of lowered efficiency and increased operating costs.

DISCLOSURE OF INVENTION

The present invention overcomes the above-described problem by the provision of a flexible mechanical coupling which may be easily assembled and disassembled by only manual manipulation such that operators may perform routine maintenance and cleaning operations on their machines even in plants having very restrictive work rules.

A collar adapted to receive a pair of shafts substantially aligned end-to-end has at least one set of diametrically opposed cutouts for receiving respective locking members loosely fitted to the cutouts. The resilient members are adapted to abut against complemental flats on the diameter of one of the shafts for locking the latter against appreciable relative rotation with respect to the collar.

A retaining sleeve is telescopically positioned over the collar for axial shifting movement to and from a position overlying the cutouts to retain the resilient members therewithin. Removable elastic bands on the outer diameter of the collar normally hold the sleeve in its retaining position.

Axial movement between the collar and the locked shaft is precluded by a diametrically extending roll pin passing through the members and shaft, and likewise held in position by the retaining sleeve. The fit between the shaft and the roll pin is such that the latter may be readily dislodged upon removal of the sleeve.

BRIEF DESCRIPTION OF THE DRAWING

FIG. 3 is an exploded perspective view of a second embodiment of the present invention.

BEST MODE FOR CARRYING OUT THE INVENTION

Figure 1:
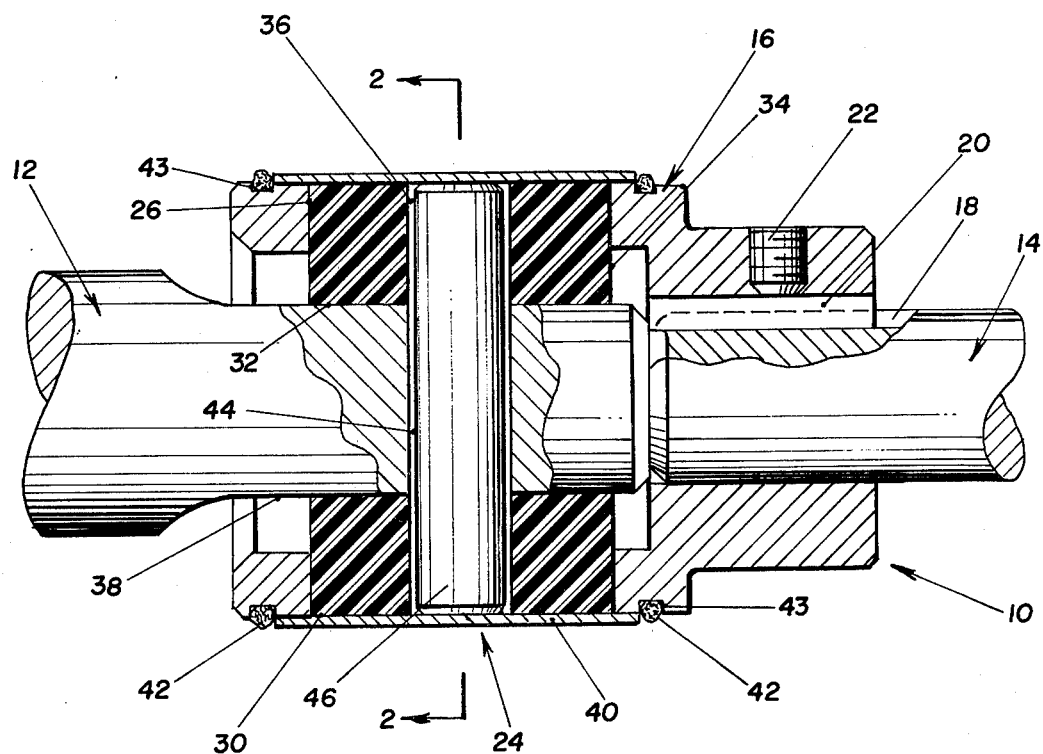
FIG. 1 is a longitudinal cross sectional view of a coupling constructed in accordance with the principles of the present invention.
Figure 2:
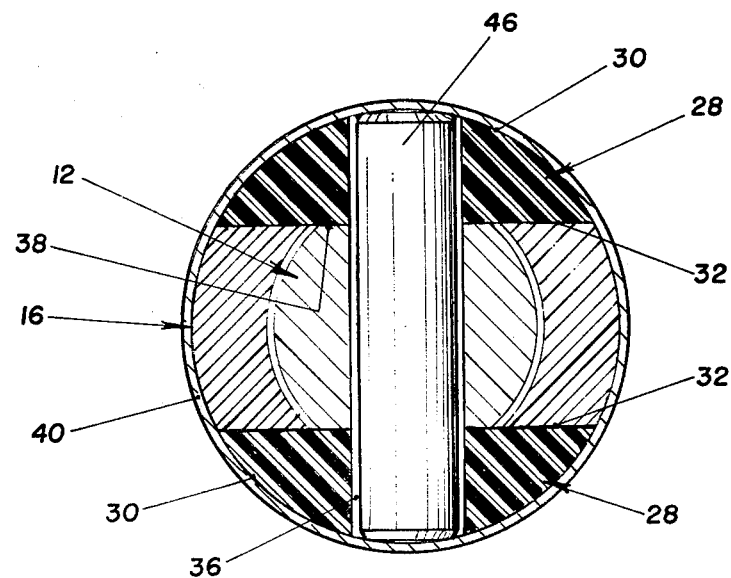
FIG. 2 is a cross sectional view taken along line 2—2 of FIG. 1 and extended to show a full diameter section.

FIG. 1 shows a flexible mechanical coupling 10 comprising a pair of shafts 12, 14 received in substantial end-to-end alignment within a tubular collar 16. Each shaft 12, 14 is in turn secured to the collar 16 for conjoint rotation therewith.

The connection between the shaft 14 and the collar 16 is of conventional construction comprising a keyway 18 formed in the shaft 14 and one end of the collar 16, a key 20 disposed within the keyway 18, and a setscrew 22 extending radially through the sidewall of the collar 16 and abuting against the key 20 to hold the latter in position. In the preferred embodiment, shaft 14 is a drive shaft coming, for example, from a gear motor.

Shaft 12, on the other hand, is connected to the collar 16 by a unique, manually releasable connector generally designated by the numeral 24 in FIG. 1. The connector 24 is particularly designed to permit limited displacement or misalignment between the axes of the shafts 12, 14 during powered rotation, yet at the same time it is capable of being assembled and disassembled without the use of any tools.

The connector 24 includes a pair of diametrically opposed cutouts 26 in the sidewall of the collar 16 and a corresponding pair of resilient locking members 28 loosely fitted to the respective cutouts 26 and adapted to be removably received therewithin as will be described. The cutouts 26 are substantially identical, each being formed by removing that portion of the sidewall of the collar 16 which falls within the space bounded by a pair of offset parallel planes extending perpendicularly of the collar axis and a third plane intersecting the collar 16 and extending parallel to the axis thereof. Thus, each cutout 26 presents a generally rectangular configuration when viewed in elevation.

Each resilient member 28 has the form of a chordal segment of a cylinder, presenting an outer cylindrical surface 30, an opposed inner planar surface 32 and a pair of chord segment ends 34. In the preferred embodiment, each locking member 28 has a central aperture 36 extending therethrough between the surfaces 30, 32.

A pair of opposed flats 38 machined on the diameter of the shaft 12 are adapted to be disposed beneath the cutouts 26 when the shaft 12 is disposed within the collar 16 as shown for example in FIG. 1. When disposed within respective cutouts 26, the locking members 28 are adapted to engage the shaft 12 with their respective planar surfaces 32 in abutment against corresponding flats 38. With the members 28 so positioned, the shaft 12 is effectively locked against substantial relative rotation with respect to the collar 16, even though some movement is permitted by virtue of the inherent resiliency of the locking members.

Since the members 28 are only loosely received within their respective cutouts 26, means in the form of a retaining sleeve 40 is provided for selectively holding the members 28 in their shaft-locking position. The sleeve 40 is telescopically received over the collar 16 and may be manually shifted along the axis thereof to and from a position overlying the cutouts 26. Removable elastic O-rings 42 are adapted to be positioned on the collar at opposite ends of the sleeve 40 for securing the latter in its retaining position as desired. To this end, O-ring grooves 43 may be machined in the outer diameter of the collar 16 at appropriate locations.

The shaft 12 is additionally provided with a transversely extending hole or passage 44 extending between the flats 38 for alignment with the apertures 36 in the members 28 when the shaft is coupled to the collar 16. A roll pin 46 is adapted to be releasably received within the passage 44 and apertures 36 whereby to restrain the shaft 12 against significant axial movement relative to the collar 16. The diameter of the pin 46 is sufficiently smaller than the diameter of the apertures 36 and passage 44 as to permit insertion and removal of the pin 46 without binding. Of couse, as shown for example in FIG. 1, the pin 46 is likewise held in position by the retainer sleeve 40.

It will be appreciated that any flexibility provided by the coupling 10 issues primarily from the locking members 28. Hence, the degree of flexibility in the coupling 10 is directly related to the type of material used in the construction of the members 28. In actual practice, it has been found that cast polyurethane having a hardness in the range of 30 to 90 durometer is an excellent material for the locking members 28. However, other materials have been used satisfactorily and it is contemplated that the coupling 10 might be tailored to various applications by utilizing different types of materials for the locking members 28.

Considering now FIG. 3, there is shown a coupling 50 which represents an alternate embodiment of the present invention.

The coupling 50 includes a pair of shafts 52, 54 adapted to be received in axial end-to-end alignment within a tubular collar 56. Like the collar 16 of the coupling 10, the collar 56 has a pair of diametrically opposed cutouts 58 which, though resembling the cutouts 26, are somewhat longer in the axial direction than the latter.

A pair of molded resilient locking members 60, each fitted to a respective cutout 58 and adapted to be removably positioned therewithin, resemble the locking members 28 of coupling 10 with the exception that they are somewhat elongated to fit the longer cutouts 58. Additionally, each flexible member 60 has a pair of opposed T-shaped grooves 62 formed in the planar surface 32 for engaging the respective shafts 52, 54 in a manner to be described. The cross portion 64 of each T-shaped groove 62 has a longitudinally concave bottom, also for a purpose which will be explained.

Unlike the flexible coupling 10, the shafts 52, 54 of the coupling 50 are each provided with a specially machined end for engagement with the flexible members 60. In this regard, each shaft 52, 54 has a square segment 66 which in turn presents multiple flats 68 for engagement by the members 60. Additionally, the outermost end of each of the shafts 52, 54 has an annular shoulder 70 adapted to be complementally received within the cross portions 64 of the respective grooves 62.

When the shafts 52, 54 are received within the collar 56, the flexible members 60 in the cutouts 58 abut against the flats 68 to restrain the shafts 52, 54 against appreciable relative rotation with respect to the collar 56 and likewise with respect to one another. Additionally, relative axial movement of the shafts 52, 54 is precluded by virtue of the locking engagement between the shoulders 70 and the cross portions 64. A retaining sleeve 72 is telescopically received on the collar 56 and is releasably held in position over the cutouts 58 by a pair of elastic O-rings 74 adapted to be removably received within respective grooves 75.

Industrial Applicability

As explained hereinabove, the flexible coupling 10 of the present invention is particularly designed for use in torque transmission applications wherein the drive train must be disassembled from time to time. The coupling 10 is especially advantageous for connecting the mutator to the drive shaft in scraped surface heat exchangers of the type having an intermittently mounted mutator.

It will be appreciated that the coupling of the present invention may be readily assembled and disassembled by solely manual manipulation such that machine operators are permitted to perform routine maintenance and cleanup procedures without requiring the aid of highly skilled mechanics. In this regard, assuming that the operator desires to disassemble the coupling 10, he initially removes one of the O-rings 42 from its holding position against the retainer sleeve 40 by simply applying slight thumb or finger pressure in the axial direction against the O-ring. Next, the retainer sleeve 40 is shifted axially along the collar 16 until the cutouts 26 are fully uncovered. The resilient locking members 28 will generally drop out of their locking position upon removal of the sleeve 40, through slight manual pressure may be required to dislodge them from the cutouts 26. Likewise, the pin 46 is easily removed from its position within the apertures 36 and passage 44. Upon removal of the pin 46 and the members 28, the coupling 10 is fully disassembled and the shafts 12, 14 may be freely shifted relative to one another as desired. Of course, reassembly of the coupling 10 can be accomplished by merely reversing the above-described procedure.

All of the benefits of manual assembly and disassembly are provided by the present invention without sacrificing functional aspects of the flexible coupling. In this regard, the resilient members 28 permit compensation for slight misalignment of the shafts 12, 14 either axially, radially, or angularly.

I claim:

1. In a flexible mechanical coupling of the type comprising a pair of generally axially aligned shafts, a tubular collar adapted to receive the proximal ends of said shafts, and first and second locking means securing the respective shafts to said collar, the improvement wherein one of said locking means comprises a connector releasable by direct manual manipulation without the use of tools, including:
   a cutout extending through the side wall of said collar;
   a flat formed in the diameter of one of said shafts and adapted to be disposed beneath said cutout when the one shaft is received within said collar;
   a resilient locking member loosely fitted to said cutout and adapted to be removably received therewithin in abutment against said flat, but detached from said one shaft and said collar, for restricting relative rotation between the collar and said one shaft, and
   a retainer on said collar manually shiftable to and from a position retaining said locking member in its rotation-restricting position within said cutout.

2. The coupling of claim 1, wherein said retainer comprises a sleeve telescopically disposed over said collar and axially shiftable therealong to and from a position covering said cutout.

3. In a flexible mechanical coupling of the type comprising a pair of generally axially aligned shafts, a tubular collar adapted to receive the proximal ends of said shafts, and first and second locking means securing the respective shafts to said collar, the improvement wherein one of said locking means comprises a connector releasable by only manually manipulation, including:
   a cutout extending through the side wall of said collar;
   a flat formed in the diameter of one of said shafts and adapted to be disposed beneath said cutout when the one shaft is received within said collar;
   a resilient locking member losely fitted to said cutout and adapted to be removably received therewithin in abutment against said flat for restricting relative rotation between the collar and said one shaft, and
   a retainer on said collar manually shiftable to and from a position retaining said locking member in its rotation-restricting position within said cutout;
   wherein said retainer comprises a sleeve telescopically disposed over said collar and axially shiftable therealong to and from a position covering said cutout; and
   a removable elastic band on the outer circumference of said collar for releasably holding said sleeve in its retaining position.

4. The coupling of claim 1, said connector including means for interlocking said one shaft and said collar against relative axial movement.

5. The coupling of claim 4, said interlocking means comprising a transversely extending aperture in said one shaft, a corresponding passage in said locking member, and a roll pin adapted to be complementally received within said aperture and said passage when the later are coaxially aligned.

6. The coupling of claim 1, said connector comprising a diametrically opposed pair of said cutouts, there being corresponding flats formed on said one shaft and there being a said resilient locking member for each of said cutouts, said retainer being positionable to retain both of said members simultaneously.

7. The coupling of claim 6, wherein said retainer comprises a sleeve telescopically disposed over said collar and axially shiftable therealong to and from a position covering said cutout.

8. In a flexible mechanical coupling of the type comprising a pair of generally axially aligned shafts, a tubular collar adapted to receive the proximal ends of said shafts, and first and second locking means securing the respective shafts to said collar, the improvement wherein one of said locking means comprises a connector releasable by only manually manipulation, including:
   a cutout extending through the side wall of said collar;
   a flat formed in the diameter of one of said shafts and adapted to be disposed beneath said cutout when the one shaft is received within said collar;
   a resilient locking member losely fitted to said cutout and adapted to be removably received therewithin an abutment against said flat for restricting relative rotation between the collar and said one shaft, and
   a retainer on said collar manually shiftable to and from a position retaining said locking member in its rotation-restricting position within said cutout;
   said connector comprising a diametrically opposed pair of said cutouts, there being corresponding flats formed on said one shaft and there being a said resilient locking member for each of said cutouts, said retainer being positionable to retain both of said members simultaneously;
   wherein said retainer comprises a sleeve telescopically disposed over said collar and axially shiftable therealong to and from a position covering said cutout; and
   a removable elastic band on the outer circumference of said collar for releasably holding said sleeve in its retaining position.

9. The coupling of claim 1, wherein each of said locking means comprises a said manually releasable connector.

10. In a flexible mechanical coupling of the type comprising a pair of generally axially aligned shafts, a tubular collar adapted to receive the proximal ends of said shafts, and first and second locking means securing the respective shafts to said collar, the improvement wherein one of said locking means comprises a connector releasable by only manually manipulation, including:
   a cutout extending through the side wall of said collar;
   a flat formed in the diameter of one of said shafts and adapted to be disposed beneath said cutout when the one shaft is received within said collar;
   a resilient locking member losely fitted to said cutout and adapted to be removably received therewithin in abutment against said flat for restricting relative rotation between the collar and said one shaft, and
   a retainer on said collar manually shiftable to and from a position retaining said locking member in its rotation-restricting position within said cutout;
   said connector including means for interlocking said one shaft and said collar against relative axial movement;
   said interlocking means comprising a shoulder on the end of said one shaft and a corresponding shoulder-receiving groove in said locking member.

* * * * *